United States Patent
Shikama et al.

(10) Patent No.: US 8,730,595 B2
(45) Date of Patent: May 20, 2014

(54) OPTICAL IMAGE STABILIZER AND LENS DRIVING APPARATUS

(71) Applicant: Nidec Copal Corporation, Tokyo (JP)

(72) Inventors: Kazuo Shikama, Tsuchiura (JP);
Takuya Machida, Koga (JP); Haruhiko Mandai, Tokyo (JP); Hiroyuki Watanabe, Shiroi (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/726,982

(22) Filed: Dec. 26, 2012

(65) Prior Publication Data
US 2013/0162851 A1 Jun. 27, 2013

(30) Foreign Application Priority Data
Dec. 27, 2011 (JP) ................................. 2011-286274

(51) Int. Cl.
*G02B 7/02* (2006.01)
(52) U.S. Cl.
USPC ......................................... 359/813; 359/819

(58) Field of Classification Search
USPC .......... 359/694–704, 811–830; 348/335, 345, 348/349, 357; 396/55, 133, 144; 310/12.02, 310/12.27, 13, 15, 49, 32
See application file for complete search history.

(56) References Cited

U.S. PATENT DOCUMENTS 6,856,469 B2 * 2/2005 Yoneyama et al. ........... 359/696
7,990,625 B2 * 8/2011 Ke ................................. 359/696
8,488,262 B2 * 7/2013 Watanabe et al. ............. 359/824

FOREIGN PATENT DOCUMENTS

JP 2006-174588 A 6/2006

* cited by examiner

*Primary Examiner* — Mohammed Hasan
(74) *Attorney, Agent, or Firm* — Troutman Sanders LLP

(57) ABSTRACT

An optical image stabilizer includes a base member, a movable member that is disposed at the base member and moves along a plane orthogonal to an optical axis, a movable-member driving portion that is disposed at the base member and the movable member, and moves the movable member in a direction orthogonal to the optical axis, and a regulator that regulates a movement of the movable member along the plane orthogonal to the optical axis. The regulator regulates the movement of the movable member with two movement paths, which are a linear movement path along which the movable member moves in a direction orthogonal to the optical axis and a rotation path along which the movable member rotates around a point on the linear movement path.

10 Claims, 8 Drawing Sheets

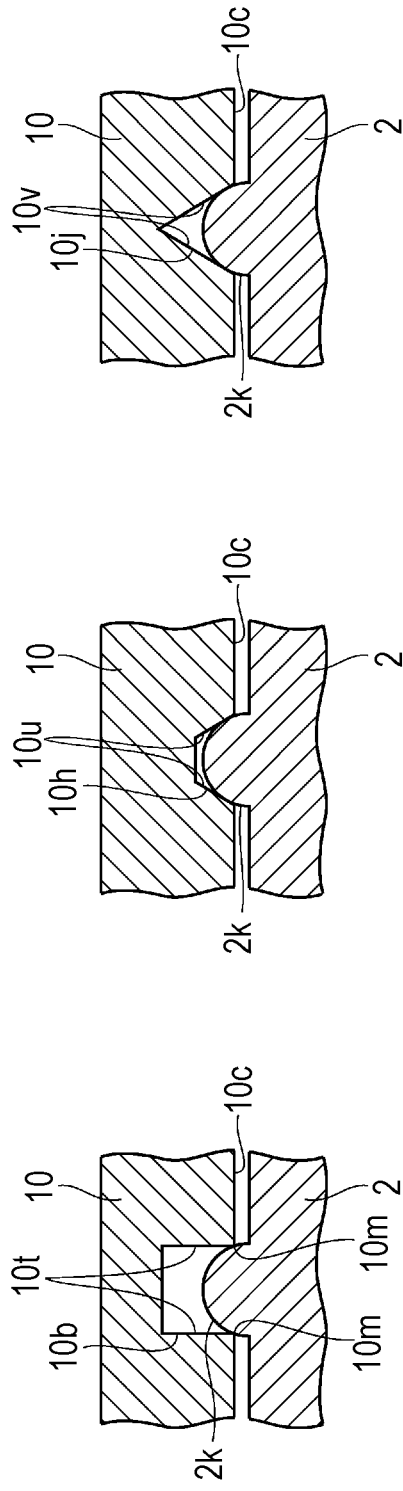

OPTICAL IMAGE STABILIZER AND LENS DRIVING APPARATUS

CROSS REFERENCES TO RELATED APPLICATIONS

The present application claims priority to Japanese Patent Application No. 2011-286274 filed in the Japan Patent Office on Dec. 27, 2011, the entire contents of which are incorporated herein by reference.

FIELD OF THE INVENTION

The present invention relates to an optical image stabilizer that corrects image shake by moving an imaging optical system or an image pickup element in a direction orthogonal to an optical axis and a lens driving apparatus including the optical image stabilizer.

BACKGROUND OF THE INVENTION

Japanese Unexamined Patent Application Publication No. 2006-174588 (hereinafter referred to as Patent Document 1) describes a technology in this field. This publication describes a lens unit including an actuator. The actuator includes a fixed plate that is fixed to a lens barrel, a movable frame that retains an image shake correction lens, and steel balls that support the movable frame. In the actuator having such a structure, the movable frame is moved with respect to the fixed plate. Accordingly, the image shake correction lens is moved in a direction orthogonal to the optical axis, so that blurring of an image formed on a film surface can be suppressed.

The movable frame included in the actuator described in Patent Document 1 has three degrees of freedom, which include two degrees of freedom for translation and one degree of freedom for rotation. The movable frame is movable along a two-dimensional plane, and is rotatable around a desired position. However, the movable frame can be moved to a desired position on the fixed plate as long as the movable frame has two degrees of freedom. When the movable frame has the above-described degrees of freedom, there is a risk that the movable frame will be moved or rotated in an unintended direction. Therefore, the actuator described in Patent Document 1 has a problem in that accuracy of the image shake correction may be reduced owing to the movement or rotation of the movable frame in the unintended direction.

SUMMARY OF THE INVENTION

Accordingly, an aspect of the present invention is to provide an optical image stabilizer capable of accurately correcting image shake and a lens driving apparatus including the optical image stabilizer.

To achieve the above-described aspect, an optical image stabilizer according to an example of the present invention includes a base member, a movable member that is disposed at the base member and that moves along a plane orthogonal to an optical axis, movable-member driving portion disposed at the base member and the movable member, the movable-member driving portion moving the movable member in a direction orthogonal to the optical axis, and a regulator that regulates the movement of the movable member along the plane orthogonal to the optical axis. The regulator regulates the movement of the movable member with two movement paths, which are a linear movement path along which the movable member moves in a direction orthogonal to the optical axis and a rotation path along which the movable member rotates around a point on the linear movement path.

According to the above-described optical image stabilizer, the movement of the movable member is limited, by the regulator, to the linear movement along the linear movement path and the rotation along the rotation path. Therefore, the movable member has two degrees of freedom including one degree of freedom for translation and one degree of freedom for rotation. As a result, unnecessary rotation around an unintended point on the plane can be suppressed, and image shake can be accurately corrected. In addition, it is not necessary to use components for correcting the movement of the movable member due to unnecessary rotation thereof. Therefore, the number of components of the lens driving apparatus is not increased and the size of the device can be reduced.

The regulator may include a cut portion or a through hole formed in one of the base member and the movable member, the cut portion or the through hole extending along the linear movement path, and a pin portion or a spherical portion that is inserted into the cut portion or the through hole, the pin portion or the spherical portion being provided on the other one of the base member and the movable member.

When the pin portion or the spherical portion is inserted into the cut portion or the though hole, the movable member can be smoothly guided along the linear movement path and rotated around the pin portion or the spherical portion. As a result, the movable member can be accurately moved.

The cut portion or the through hole may have a pair of opposing side walls that are parallel to the linear movement path, and the pin portion may slide along the pair of side walls. In this case, the pin portion is in line contact with the side walls of the cut portion or the through hole, so that the movable member can be prevented from becoming tilted with respect to the optical axis.

The cut portion or the through hole may have a pair of inclined surfaces that are parallel to the linear movement path and that form a V-shape, and the pin portion or the spherical portion may slide along the pair of inclined surfaces. In this case, the pin portion or the spherical portion is in point contact with the inclined surfaces of the cut portion or the through hole, so that the frictional resistance can be reduced.

The cut portion or the through hole may have a pair of opposing side walls that are parallel to the linear movement path, and the spherical portion may slide along opening-side edge portions of the pair of side walls. In this case, the spherical portion is in point contact with the side walls of the cut portion or the through hole, so that the frictional resistance can be reduced.

A lens driving apparatus according to the present invention includes the above-described optical image stabilizer, a lens frame that is disposed at the movable member, retains a lens, and moves in a direction of the optical axis, and lens-driving portion that is disposed at the movable member and the lens frame and moves the lens in the direction of the optical axis.

According to the above-described lens driving apparatus, the movement of the movable member along the plane orthogonal to the optical axis is limited to the linear movement and the rotation by the regulator. Accordingly, unnecessary rotation of the lens frame that retains the lens around an unintended point can be suppressed. Therefore, image shake can be accurately corrected.

According to the present invention, image shake can be accurately corrected.

BRIEF DESCRIPTION OF THE DRAWINGS

FIGS. 9A to 9E are sectional views of the regulator according to tenth to fourteenth modifications.

DETAILED DESCRIPTION

An optical image stabilizer and a lens driving apparatus according to an example of the present invention will now be described in detail with reference to the drawings.

An optical image stabilizer included in a digital camera corrects image shake by changing a positional relationship between an imaging optical system including a focus adjusting lens or a zoom lens and an image pickup element on which light that has passed through the imaging optical system is focused. One type of optical image stabilizer moves the imaging optical system while the image pickup element is fixed. Another type of optical image stabilizer moves the image pickup element while the imaging optical system is fixed. The lens driving apparatus according to the present example corrects hand movement by moving a focus adjustment mechanism, which is an imaging optical system, with respect to an image pickup element.

Figure 1:
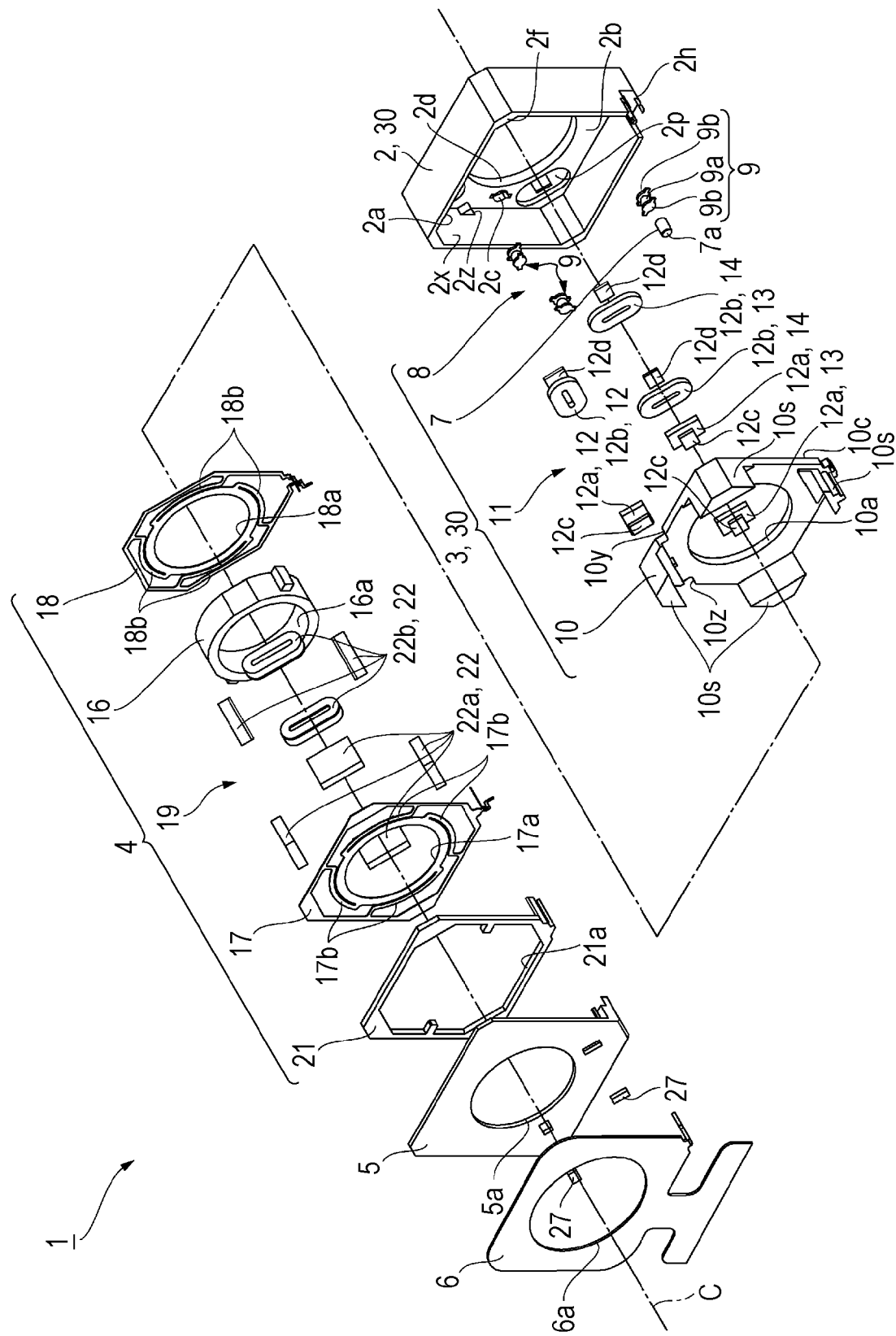
FIG. 1 is an exploded perspective view of a lens driving apparatus including an optical image stabilizer according to an example of the present invention.

Referring to FIG. 1, a lens driving apparatus 1 having a shake correcting function includes a box-shaped base member 2 that houses a hand movement correcting mechanism 3 and a focus adjustment mechanism 4, the hand movement correcting mechanism 3 that corrects hand movement by moving the focus adjustment mechanism 4 in a plane orthogonal to the optical axis C, the focus adjustment mechanism 4 that includes a lens (not shown) and moves the lens in a direction of the optical axis C, a cover 5 that closes the base member 2, and a flexible printed circuit board 6 that provides electrical connection between the lens driving apparatus 1 and an external circuit. The lens driving apparatus 1 is disposed in front of, for example, a charge coupled device (CCD) image sensor (not shown) or a complementary metal oxide semiconductor (CMOS) image sensor (not shown), which is an image pickup element.

The base member 2 and the hand movement correcting mechanism 3 form a hand movement correcting device 30. Hand movement correction is an example of image shake correction for correcting image shake.

The base member 2 is a rectangular-box-shaped member having a rectangular opening 2a that is centered on the optical axis C. A support surface 2b that is orthogonal to the optical axis C is provided in the base member 2. Recesses 2c and a hole 2g are formed in the support surface 2b. The hole 2g is formed between a circular opening 2d that is centered on the optical axis C and a corner portion 2h (see FIG. 3).

The hand movement correcting mechanism 3 corrects hand movement by moving the focus adjustment mechanism 4, which is attached to a movable member 10, along a plane orthogonal to the optical axis C. The hand movement correcting mechanism 3 includes a supporting portion 8 that functions as balls for supporting the movable member 10 that is frame shaped, the movable member 10 to which the focus adjustment mechanism 4 is attached, a movable-member driving portion 11 that drives the movable member 10 in a direction orthogonal to the optical axis C, and a regulator 15 that regulates the movement of the movable member 10 in the base member 2.

The supporting portion 8, which supports the movable member 10 in a manner such that the movable member 10 is movable along a plane orthogonal to the optical axis C, includes three supporting portions 9. Each supporting portion 9 includes a spherical member 9a that is made of metal and supports the movable member 10 and a pair of slide plates 9b that sandwich the spherical member 9a to reduce the rolling resistance of the spherical member 9a.

The movable member 10 for moving the focus adjustment mechanism 4 in a direction orthogonal to the optical axis C is housed in the base member 2 while being supported by the supporting portion 8. The movable member 10 is a rectangular-parallelepiped-shaped member having a circular opening 10a that is centered on the optical axis C. The movable member 10 has a bottom surface 10c that faces the support surface 2b of the base member 2.

Figure 5:
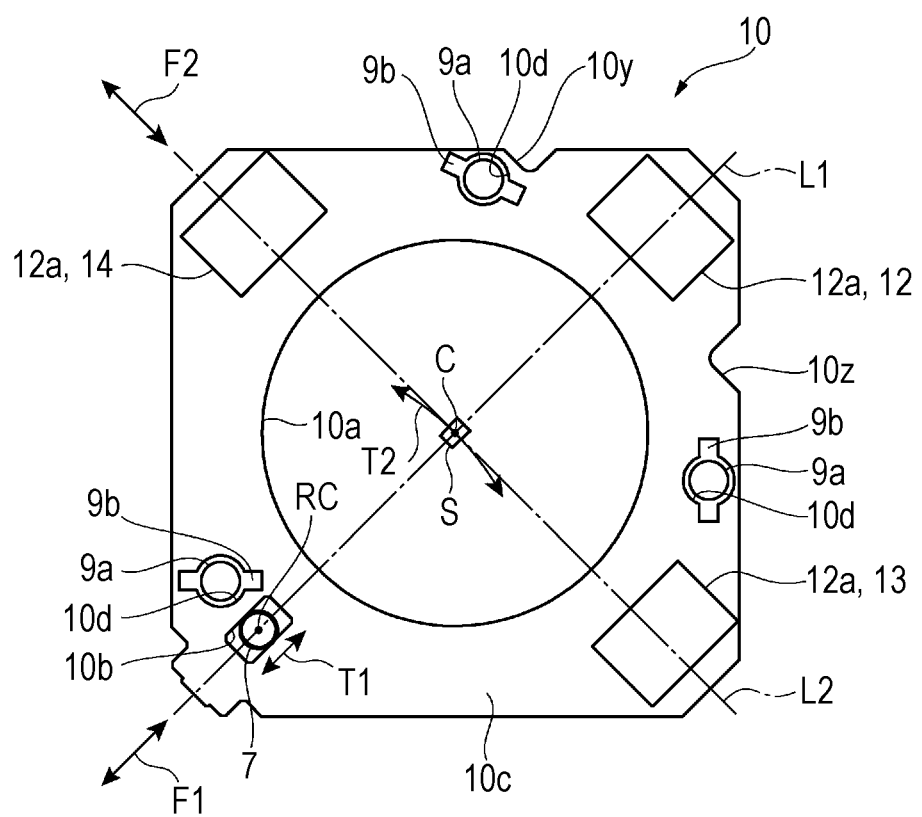
FIG. 5 is a bottom view of a movable member illustrated in FIG. 1.

As illustrated in FIG. 5, recesses 10d are formed in the bottom surface 10c of the movable member 10. One of the slide plates 9b of each supporting portion 9 is fixed to one of the recesses 10d. To fix the other one of the slide plates 9b of each supporting portion 9, the recesses 2c are formed in the base member 2 at positions corresponding to the recesses 10d. The slide plates 9b may be fixed to the recesses 10d and 2c by means of press-fitting or adhesion. Each of the recesses 10d and 2c has a side wall having a cylindrical shape with outwardly cut portions formed in the outer periphery thereof. When an adhesive is applied to the cut portions, the adhesive does not flow out of the cut portions. Therefore, the adhesive is prevented from being applied to the entire areas of the recesses 10d and 2c. The spherical members 9a are disposed between the recesses 2c and 10d. The inner diameters of the recesses 2c and 10d are greater than the outer diameter of the spherical members 9a. Therefore, the spherical members 9a are capable of rolling in the recesses 2c. The supporting portions 9 are not particularly limited as long as the movable member 10 is supported so as to be movable along the plane.

The movable-member driving portion 11 for driving the movable member 10 in a direction orthogonal to the optical axis C includes three actuators 12, 13, and 14. The actuator 12 and a cut portion 10b, which will be described below, are arranged on a diagonal line L1. The actuator 12 and the cut portion 10b face each other across the optical axis C. The actuator 12 applies a driving force F1 having a component along the diagonal line L1 to the movable member 10.

The actuators 13 and 14 are arranged on a diagonal line L2 that is orthogonal to the diagonal line L1. The actuators 13 and 14 face each other across the optical axis C. The actuators 13 and 14 apply a driving force F2 having a component along the diagonal line L2 to the movable member 10.

Figure 2:
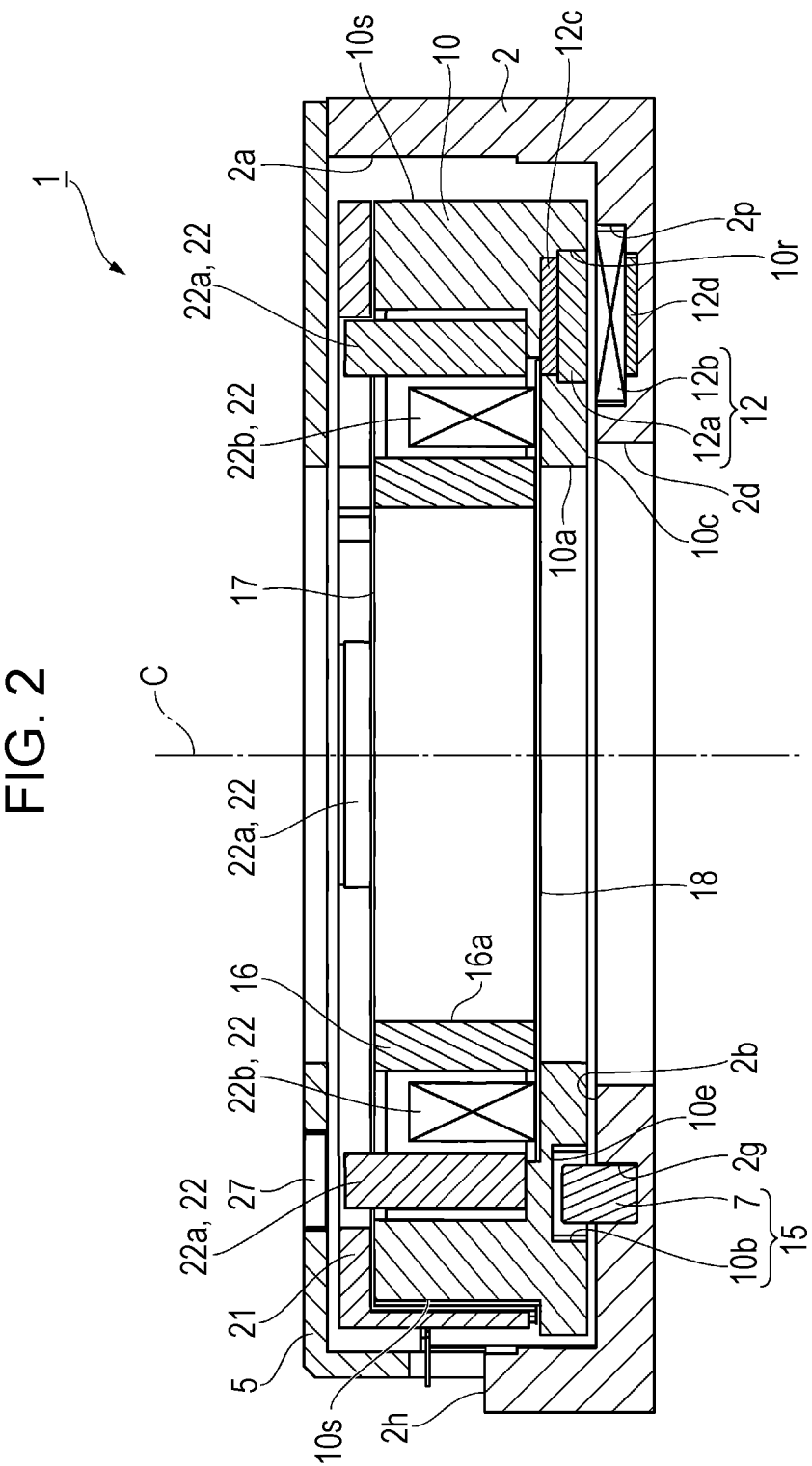
FIG. 2 is a sectional view of the lens driving apparatus illustrated in FIG. 1.

The actuators 12, 13, and 14 have similar structures. The structure of the actuator 12 will now be described as an example. As illustrated in FIGS. 1 and 2, the actuator 12 includes a magnet 12a and a coil 12b. The magnet 12a is disposed in a recess 10r formed in the bottom surface 10c of the movable member 10, and the coil 12b is disposed in a recess 2p formed in the support surface 2b of the base member 2. The magnet 12a is arranged so as to face the coil 12b.

The actuator 12 is disposed between a pair of yoke plates 12c and 12d, one of which is disposed on the magnet-12a side and the other one of which is disposed on the coil-12b side.

Thus, a magnetic path of the magnet 12a and the coil 12b is formed. Even when no electricity is supplied to the coil 12b, a magnetic attractive force is applied between the magnet 12a and the yoke plate 12d, so that the movable member 10 is retained at a home position.

Figure 3:
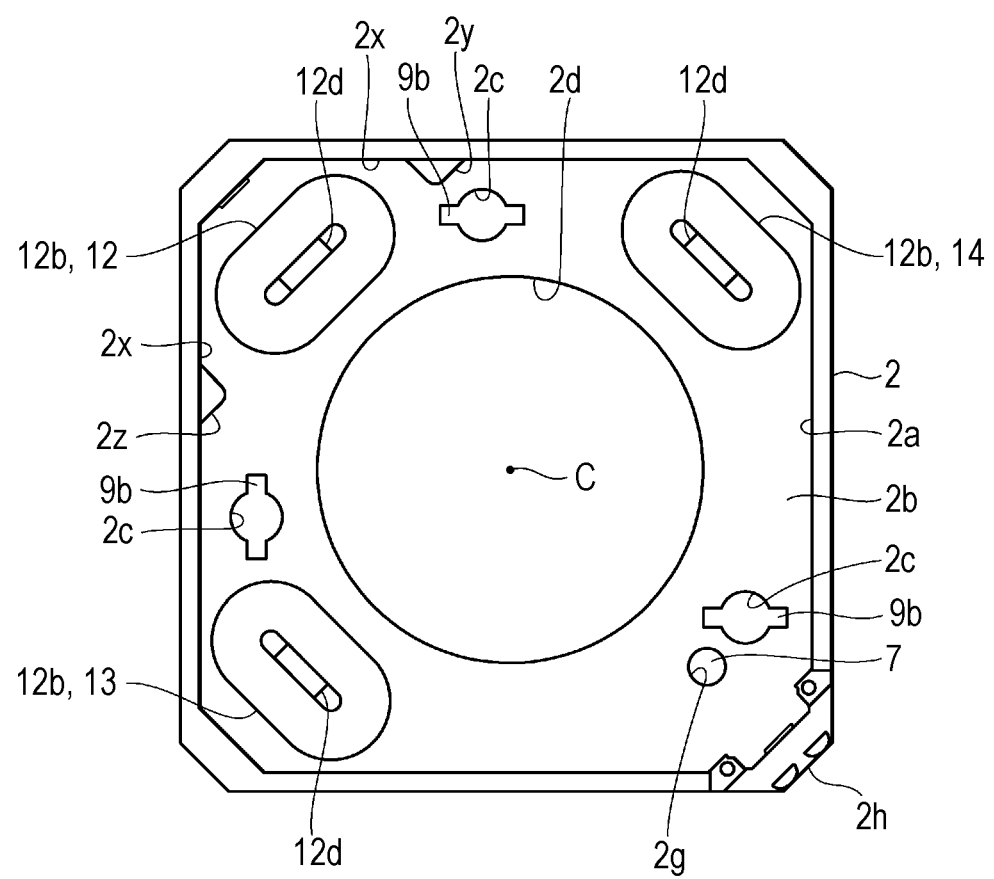
FIG. 3 is a plan view of a base member illustrated in FIG. 1.
Figure 4:
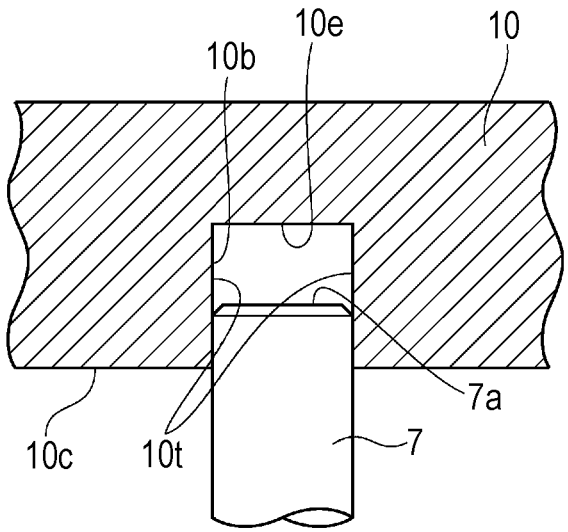
FIG. 4 is an enlarged sectional view of a relevant part of a regulator according to the example.

Referring to FIGS. 3 to 5, the regulator 15 for regulating the movement of the movable member 10 includes a pin (sliding portion) 7 that is fixed to the base member 2 and serves as a pin portion and a cut portion 10b formed in the movable member 10.

The pin (sliding portion) 7 is a columnar member that extends in the direction of the optical axis C. A base end of the pin 7 is fixed by being inserted into the hole 2g formed in the base member 2.

As illustrated in FIG. 5, the cut portion 10b formed in the movable member 10 is a long cut portion that extends along the diagonal line L1 of the movable member 10. The cut portion 10b is formed in the bottom surface 10c at a position corresponding to the position of the hole 2g into which the pin 7 is inserted. Since the cut portion 10b is formed at this position, the pin 7 is inserted into the cut portion 10b. The width of the cut portion 10b in a direction orthogonal to the longitudinal direction is set such that the pin 7 is slidable along the side surfaces of the cut portion 10b. As illustrated in FIG. 4, the cut portion 10b, which has a rectangular shape in cross section, has a pair of opposing side walls (regulating surfaces) 10t that define the width within which the pin 7 is slidable. The depth of the cut portion 10b is set such that a top end surface 7a of the pin 7 does not come into contact with a bottom surface 10e of the cut portion 10b.

The pin 7 is inserted into the cut portion 10b of the movable member 10, and the cut portion 10b extends along the diagonal line L1. Therefore, the movable member 10 is capable of moving linearly by being guided along a linear movement path T1 that is set in a direction in which the side walls 10t of the cut portion 10b extend. The movable member 10 is also capable of rotating along a rotation path T2 that is centered on a rotation center RC, which coincides with the pin 7 that is positioned on the linear movement path T1. In other words, the position of the movable member 10 may be expressed in a circular coordinate system based on a single radius vector and a single deviation angle. The optical axis C may be accurately moved to a desired position by using the combination of the linear movement and the rotation.

Figure 6:
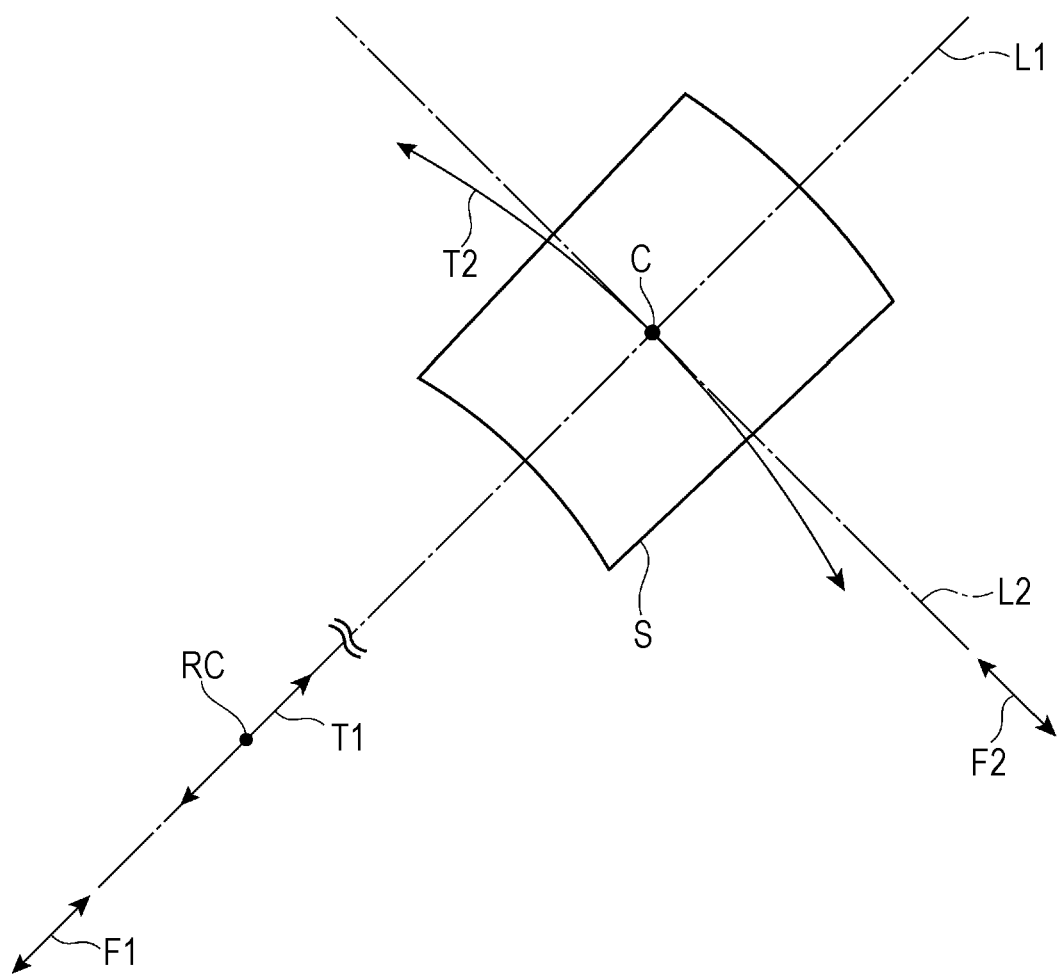
FIG. 6 is an enlarged view illustrating a movable area of an optical axis.

Referring to FIGS. 5 and 6, an area S within which the optical axis C is movable is determined by a distance within which the movable member 10 is linearly movable and an angle range within which the movable member 10 is rotatable. The distance within which the movable member 10 is linearly movable is determined by the length of the cut portion 10b in the longitudinal direction. The angle range within which the movable member 10 is rotatable is determined by gaps between cutaway portions 10y and 10z formed in the peripheral edges of the movable member 10 and contact portions 2y and 2z (see FIG. 3) provided on inner wall surfaces 2x of the base member 2. The contact portions 2y and 2z include surfaces that extend in the longitudinal direction of the cut portion 10b. The angle range within which the movable member 10 is rotatable may instead be determined by the movable distance of each spherical member 9a that is disposed between the corresponding recesses 2c and 10d.

As illustrated in FIG. 1, the focus adjustment mechanism 4 which is attached to the movable member 10 includes a lens frame 16 that retains a lens (not shown), plate springs 17 and 18 that urge the lens frame 16 in the direction of the optical axis C, lens-driving portion 19 that drives the lens frame 16 in the direction of the optical axis C, and a fixing frame 21 that reinforces the attachment of the plate spring 17 into the movable member 10.

The lens frame 16, which retains a lens group (not shown) including one or more lenses, is a cylindrical member having a hole 16a to which the lenses are fitted. The optical axis C is an optical axis of the lenses retained by the lens frame 16. The lens frame 16 is sandwiched by the plate springs 17 and 18 in the direction of the optical axis C.

The plate spring 17 is a rectangular thin-plate-shaped member having a circular opening 17a centered on the optical axis C. The plate spring 17 is disposed between the fixing frame 21 and the lens frame 16. An outer peripheral portion of the plate spring 17 is fixed to the movable member 10, and an inner peripheral portion of the plate spring 17 is fixed to the lens frame 16. The outer and inner peripheral portions of the plate spring 17 are connected to each other by elastic arm portions 17b. Owing to the arm portions 17b, the plate spring 17 has elasticity in the direction of the optical axis C.

The plate spring 18 is a rectangular thin-plate-shaped member having a circular opening 18a centered on the optical axis C. The plate spring 18 is disposed between the lens frame 16 and the movable member 10. An outer peripheral portion of the plate spring 18 is fixed to the movable member 10, and an inner peripheral portion of the plate spring 18 is fixed to the lens frame 16. The outer and inner peripheral portions of the plate spring 18 are connected to each other by elastic arm portions 18b. Owing to the arm portions 18b, the plate spring 18 has elasticity in the direction of the optical axis C.

The lens-driving portion 19 that drives the lens frame 16 in the direction of the optical axis C includes four actuators 22. The actuators 22 are arranged along a plane orthogonal to the optical axis C with phase differences of 90 degrees therebetween. The actuators 22 have similar structures, and each actuator 22 includes a magnet 22a and a coil 22b. The magnets 22a are fixed to respective upright parts 10s of the movable member 10, and the coils 22b are fixed to an outer peripheral surface of the lens frame 16.

The fixing frame 21, which reinforces the attachment of the plate spring 17 to the movable member 10, is a plate-shaped member having an opening 21a. The fixing frame 21 is fixed to the top surfaces of the upright parts 10s of the movable member 10.

The cover 5 is a plate-shaped member that is fixed to an end portion 2f of the base member 2 at the open side and has a circular opening 5a centered on the optical axis C. Two Hall elements 27, which are magnetic-field detecting elements, are provided on the cover 5. The Hall elements 27 detect magnetic fields of the magnets 22a arranged on the movable member 10. The Hall elements 27 are arranged with an interval of 90 degrees therebetween, so that the position of the movable member 10 along the plane orthogonal to the optical axis C can be detected.

The flexible printed circuit board 6, which is a circuit board that provides electrical connection between the lens driving apparatus 1 and an external circuit, is connected to the Hall elements 27.

The operation of the hand movement correcting mechanism 3 will now be described. When a hand movement occurs during an image capturing operation of an apparatus (for example, a camera) in which the lens driving apparatus 1 is incorporated, the position of the optical axis C may vary. In such a case, the hand movement is detected by a hand-movement detection sensor, such as a gyro sensor. Accordingly, a control portion (not shown) outputs control signals for driving the shake correcting mechanism 3 to the coils 12b of the actuators 12, 13, and 14 so that the optical axis C is maintained at a predetermined position on the image pickup element.

In this case, as illustrated in FIGS. 5 and 6, the actuator 12 generates a driving force F1 upon receiving the corresponding control signal and causes the movable member 10 to linearly move along the linear movement path T1. The actuators 13 and 14 generate a driving force F2 upon receiving the corresponding control signals and cause the movable member 10 to rotate along the rotation path T2. The optical axis C is moved to the predetermined position by the linear movement and the rotation. The movement of the movable member 10 is regulated by the regulator 15 so that the movable member 10 has two degrees of freedom, which include one degree of freedom for linear movement and one degree of freedom for rotation. Therefore, the movable member 10 is capable of moving the optical axis C to a desired position within the area S. According to the above-described movement, the optical axis C is maintained at the predetermined position on the image pickup element, such as a CMOS sensor, and the hand movement is corrected.

In the lens driving apparatus 1 having the above-described structure, since the hand movement correcting mechanism 3 includes the regulator 15, the movement of the movable member 10 is limited to the linear movement along the linear movement path T1, which is orthogonal to the optical axis C, and the rotation along the rotation path T2 centered on the rotation center RC, which is a point on the linear movement path T1. Since the movement of the movable member 10 is regulated, unnecessary rotation around an unintended point on the support surface 2b can be suppressed. Therefore, hand movement can be accurately corrected. In addition, it is not necessary to use actuators or the like for correcting the movement of the movable member 10 due to unnecessary rotation thereof in the lens driving apparatus 1. Therefore, the number of components of the lens driving apparatus 1 is not increased and the size of the lens driving apparatus 1 can be reduced.

In addition, in the lens driving apparatus 1, since the focus adjustment mechanism 4 is arranged on the movable member 10, the focus adjustment mechanism 4 and the movable member 10 may share some components. Therefore, the number of components of the lens driving apparatus 1 can be reduced and the size of the lens driving apparatus 1 can be reduced.

In the lens driving apparatus 1, the regulator 15 includes the cut portion 10b formed in the movable member 10 and the pin 7 provided on the base member 2 and inserted into the cut portion 10b. A side surface of the pin 7 is in line contact with and slides along the side walls of the cut portion 10b, and thereby the pin 7 is guided along the linear movement path T1. Therefore, the movable member 10 can be linearly moved with high accuracy.

The present invention is not limited to the above-described example.

The regulator 15 is not particularly limited as long as the regulator 15 includes a regulating surface that extends in a direction orthogonal to the optical axis C so as to include a straight line that is orthogonal to the optical axis C and a sliding portion that is in contact with the regulating surface. A part of the sliding portion that is in contact with the regulating surface preferably has a circular shape in a plane orthogonal to the optical axis C. As long as these conditions are satisfied, the regulator 15 may have various modifications.

Figure 7A:
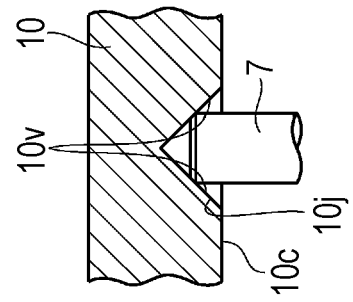
FIGS. 7A to 7D are sectional views of the regulator according to first to fourth modifications.
Figure 7B:
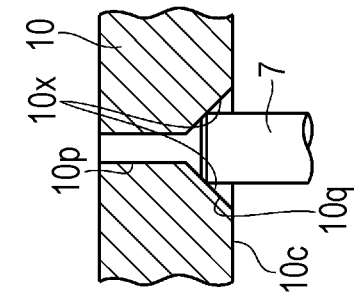

In the above-described regulator 15, the cut portion 10b has a rectangular shape in cross section. However, the cross sectional shape is not limited to a rectangular shape. As illustrated in FIGS. 7A and 7B, cut portions having pairs of inclined surfaces (regulating surfaces) 10u and 10v that form a V-shape may instead be provided.

As in a first modification illustrated in FIG. 7A, the cut portion having a pair of inclined surfaces that form a V-shape may be the cut portion 10h having a trapezoidal shape in cross section. In this case, the pin 7 is in point contact with the inclined surfaces 10u of the cut portion 10h, so that the frictional resistance can be reduced. As in a second modification illustrated in FIG. 7B, the cut portion having a pair of inclined surfaces that form a V-shape may be the cut portion 10j having a V-shape in cross section. In this case, the pin 7 is in point contact with the inclined surfaces 10v of the cut portion 10j, so that the frictional resistance can be reduced.

Figure 7C:
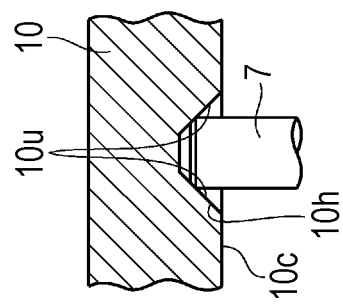

Although the pin 7 is inserted into the cut portion 10b in the regulator 15, the section into which the pin 7 is inserted is not limited to a cut portion. For example, as in a third modification illustrated in FIG. 7C, a through hole 10k having a rectangular shape in cross section may be formed instead of the cut portion 10b of the regulator 15. In this case, the pin 7 is in line contact with wall surfaces (regulating surfaces) 10w of the through hole 10k, so that the movable member 10 is prevented from becoming tilted with respect to the plane orthogonal to the optical axis C.

Figure 7D:
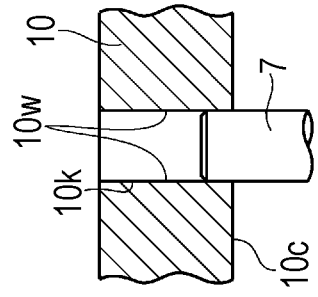

As in a fourth modification illustrated in FIG. 7D, a through hole 10p having a partially trapezoidal shape in cross section may be formed instead of the cut portion 10b of the regulator 15. The through hole 10p having a partially trapezoidal shape in cross section is a through hole having a pair of inclined surfaces 10x that form a V-shape. The pin 7 is inserted into a trapezoidal portion 10q of the through hole 10p. The pin 7 is in point contact with the pair of inclined surfaces (regulating surfaces) 10x of the trapezoidal portion 10q, so that the frictional resistance can be reduced.

In other examples of the regulator 15, as in fifth to ninth modifications illustrated in FIGS. 8A to 8E, a spherical member (spherical portion, sliding portion) 9c may be disposed between the base member 2 and the movable member 10. The spherical member 9c is in point contact with the movable member 10, so that the frictional resistance can be reduced.

Figure 8C:
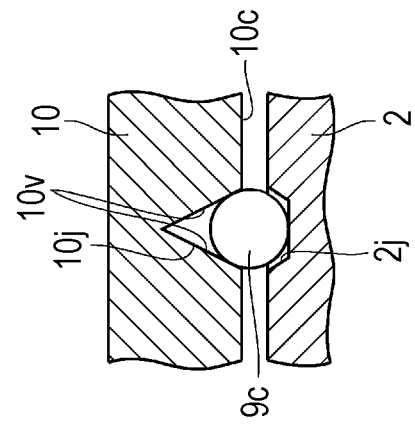
FIGS. 8A to 8E are sectional views of the regulator according to fifth to ninth modifications.
Figure 8B:
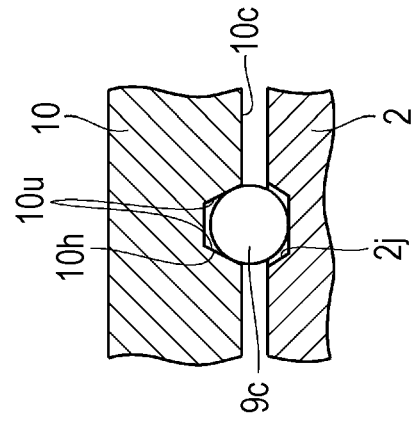
Figure 8A:
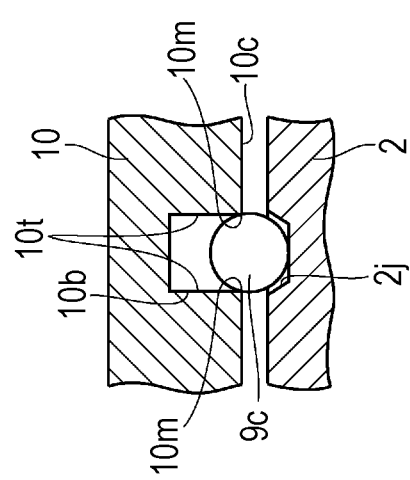

As in the fifth modification illustrated in FIG. 8A, the spherical member 9c may be disposed between the cut portion 10b having a rectangular shape in cross section and a recess 2j formed in the base member 2 so that the spherical member 9c slides along opening-side edge portions 10m of the pair of side walls 10t of the cut portion 10b.

As in the sixth modification illustrated in FIG. 8B, the spherical member 9c may be disposed between the cut portion 10h having a trapezoidal shape in cross section and the recess 2j formed in the base member 2.

As in the seventh modification illustrated in FIG. 8C, the spherical member 9c may be disposed between the cut portion 10j having a V-shape in cross section and the recess 2j formed in the base member 2.

Figure 8E:
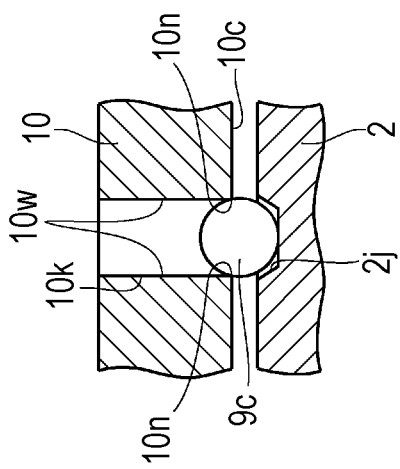
Figure 8D:
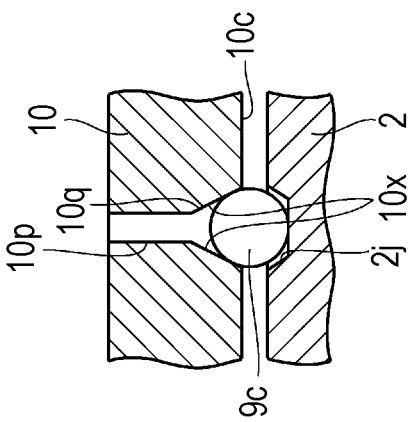

As in the eighth modification illustrated in FIG. 8D, the spherical member 9c may be disposed between the through hole 10k having a rectangular shape in cross section and the recess 2j formed in the base member 2 so that the spherical member 9c slides along opening-side edge portions 10n of the pair of side walls 10w of the through hole 10k.

As in the ninth modification illustrated in FIG. 8E, the spherical member 9c may be disposed between the through hole 10p having a partially trapezoidal shape in cross section and the recess 2j formed in the base member 2. The spherical member 9c is inserted into the trapezoidal portion 10q of the through hole 10p.

In other examples of the regulator 15, as in tenth to fourteenth modifications illustrated in FIGS. 9A to 9E, a projection including a spherical portion (spherical portion, sliding portion) 2k may be formed on the base member 2. The projection 2k is in point contact with the movable member 10, so that the frictional resistance can be reduced.

As in the tenth modification illustrated in FIG. 9A, the projection 2k may be inserted into the cut portion 10b having a rectangular shape in cross section so that the projection 2k slides along the opening-side edge portions 10m of the pair of side walls 10t of the cut portion 10b. As in the eleventh modification illustrated in FIG. 9B, the projection 2k may be inserted into the cut portion 10h having a trapezoidal shape in cross section.

As in the twelfth modification illustrated in FIG. 9C, the projection 2k may be inserted into the cut portion 10j having a V-shape in cross section. As in the thirteenth modification illustrated in FIG. 9D, the projection 2k may be inserted into the through hole 10k having a rectangular shape in cross section so that the projection 2k slides along the opening-side edge portions 10n of the pair of side walls 10w of the through hole 10k.

As in the fourteenth modification illustrated in FIG. 9E, the projection 2k may be inserted into the through hole 10p having a partially trapezoidal shape in cross section. The projection 2k is inserted into the trapezoidal portion 10q of the through hole 10p.

In the above-described regulator 15 and other examples of the regulator 15, as illustrated in FIGS. 4 and 7A to 7D, the pin 7 is fixed to the base member 2 and the cut portion 10b, 10h, or 10j or the through hole 10k or 10p is formed in the movable member 10. However, the structure of the regulator 15 is not limited to this. For example, the pin 7 may be fixed to the movable member 10 while the cut portion 10b, 10h, or 10j or the through hole 10k or 10p is formed in the base member 2. In addition, the pin 7, which serves as a pin portion, is not limited to a member that is separate from the base member 2 and the movable member 10, and may be formed integrally with the base member 2 or the movable member 10.

In the fifth to ninth modifications illustrated in FIGS. 8A to 8E, the spherical member 9c may be disposed on the movable member 10 instead of the base member 2, and the cut portion 10b, 10h, or 10j or the through hole 10k or 10p may be formed in the base member 2.

In the tenth to fourteenth modifications illustrated in FIGS. 9A to 9E, the projection 2k may be formed on the movable member 10 instead of the base member 2, and the cut portion 10b, 10h, or 10j or the through hole 10k or 10p may be formed in the base member 2.

According to the regulator 15, the hand movement correcting mechanism 3 and the focus adjustment mechanism 4 are moved together. However, in the case where the hand movement correcting mechanism 3 includes a hand movement correction lens, the hand movement correcting mechanism 3 and the focus adjustment mechanism 4 may be moved separately from each other.

In the movable-member driving portion 11, the coils 12b are provided on the base member 2 and the magnets 12a are provided on the movable member 10. However, the magnets 12a may instead be provided on the base member 2, and the coils 12b on the movable member 10. In addition, in the lens-driving portion 19, the magnets 22a are provided on the movable member 10, and the coils 22b are provided on the lens frame 16. However, the coils 22b may instead be provided on the movable member 10, and the magnets 22a on the lens frame 16.

In addition, although the lens frame 16 of the focus adjustment mechanism 4 retains a focus adjusting lens, the lens frame 16 may instead retain a field-angle adjusting lens.

In the above-described lens driving apparatus 1, the hand movement correcting device 30 moves the focus adjustment mechanism 4, which is an imaging optical system, in a direction orthogonal to the optical axis C. However, the object moved by the hand movement correcting device 30 is not limited to the imaging optical system. The focus adjustment mechanism 4 may be fixed to the base member 2, and the image pickup element may be disposed on the movable member 10 and moved in a direction orthogonal to the optical axis C with respect to the focus adjustment mechanism 4.

Obviously, numerous modifications and variations of the present invention are possible in light of the above teachings. It is therefore to be understood that within the scope of the appended claims, the invention may be practiced otherwise than as specifically described herein.

What is claimed is:

1. An optical image stabilizer comprising:
a base member;
a movable member that is disposed at the base member and moves along a plane orthogonal to an optical axis;
a movable-member driving portion that is disposed at the base member and the movable member, and moves the movable member in a direction orthogonal to the optical axis; and
a regulator that regulates a movement of the movable member along the plane orthogonal to the optical axis,
wherein the regulator regulates the movement of the movable member with two movement paths, which are a linear movement path along which the movable member moves in a direction orthogonal to the optical axis and a rotation path along which the movable member rotates around a point on the linear movement path.

2. The optical image stabilizer according to claim 1,
wherein the regulator includes
one of a cut portion and a through hole, which is formed in one of the base member and the movable member, and extends along the linear movement path, and
one of a pin portion and a spherical portion, which is inserted into one of the cut portion and the through hole, and provided on the other one of the base member and the movable member.

3. The optical image stabilizer according to claim 2,
wherein one of the cut portion and the through hole has a pair of opposing side walls that are parallel to the linear movement path, and
wherein the pin portion slides along the pair of side walls.

4. The optical image stabilizer according to claim 2,
wherein one of the cut portion and the through hole has a pair of inclined surfaces that are parallel to the linear movement path and form a V-shape,
wherein one of the pin portion and the spherical portion slides along the pair of inclined surfaces.

5. The optical image stabilizer according to claim 2,
wherein one of the cut portion and the through hole has a pair of opposing side walls that are parallel to the linear movement path, and
wherein the spherical portion slides along opening-side edge portions of the pair of side walls.

6. The optical image stabilizer according to claim 1,
wherein the regulator includes
a regulating surface that is provided on one of the base member and the movable member, and extends along the linear movement path, and
a sliding portion that is provided on the other one of the base member and the movable member, and is in contact with the regulating surface.

7. The optical image stabilizer according to claim 6,
wherein a part of the sliding portion that is in contact with the regulating surface has a circular shape in a plane orthogonal to the optical axis.

8. The optical image stabilizer according to claim 6,
wherein the regulating surface is provided on one of a cut portion and a through hole, which extends along the linear movement path, and
wherein the sliding portion is one of a pin portion and a spherical portion, which is inserted into one of the cut portion and the through hole.

9. The optical image stabilizer according to claim 6,
wherein the regulating surface is parallel to the linear movement path and includes one of a pair of opposing side walls and a pair of inclined surfaces, which form a V-shape.

10. A lens driving apparatus comprising:
an optical image stabilizer that comprises:
  a base member;
  a movable member that is disposed at the base member and moves along a plane orthogonal to an optical axis;
  a movable-member driving portion that is disposed at the base member and the movable member, and moves the movable member in a direction orthogonal to the optical axis; and
  a regulator that regulates the movement of the movable member along the plane orthogonal to the optical axis,
  wherein the regulator regulates the movement of the movable member with two movement paths, which are a linear movement path along which the movable member moves in a direction orthogonal to the optical axis and a rotation path along which the movable member rotates around a point on the linear movement path;
a lens frame that is disposed at the movable member, retains a lens, and moves in a direction of the optical axis; and
a lens-driving portion that is disposed at the movable member and the lens frame, and moves the lens in the direction of the optical axis.

* * * * *